US011898737B1

(12) United States Patent
Yando et al.

(10) Patent No.: US 11,898,737 B1
(45) Date of Patent: Feb. 13, 2024

(54) CAGED GLASS FIXTURE

(71) Applicant: W Schonbek LLC, Port Washington, NY (US)

(72) Inventors: Roslyn Yando, Brainardsville, NY (US); Chad Recore, Peru, NY (US)

(73) Assignee: W Schonbek LLC, Port Washington, NY (US)

( * ) Notice: Subject to any disclaimer, the term of this patent is extended or adjusted under 35 U.S.C. 154(b) by 0 days.

(21) Appl. No.: 18/217,754

(22) Filed: Jul. 3, 2023

Related U.S. Application Data

(60) Provisional application No. 63/454,824, filed on Mar. 27, 2023.

(51) Int. Cl.

| | |
|---|---|
| ***F21V 15/02*** | (2006.01) |
| ***F21V 3/02*** | (2006.01) |
| ***F21V 17/00*** | (2006.01) |
| ***F21V 21/104*** | (2006.01) |

(52) U.S. Cl.
CPC ................ *F21V 3/02* (2013.01); *F21V 15/02* (2013.01); *F21V 17/002* (2013.01); *F21V 21/104* (2013.01)

(58) Field of Classification Search
CPC .......... F21V 3/02; F21V 15/02; F21V 17/002; F21V 21/104
See application file for complete search history.

(56) References Cited

U.S. PATENT DOCUMENTS 3,582,643 A * 6/1971 Heise ........................ F21V 1/00 362/360
5,416,685 A * 5/1995 Myers ..................... F21L 14/02 362/399
7,547,113 B2 6/2009 Lee
10,161,602 B1 * 12/2018 Bleile ................... F21V 17/166
D869,058 S * 12/2019 Adelman ..................... D26/113
10,670,203 B1 * 6/2020 Glazer .................. F21V 17/002
2011/0103078 A1 * 5/2011 Zheng ..................... F21V 15/01 362/362
2011/0265374 A1 * 11/2011 Tompkins, IV ...... A01K 15/025 119/711
2015/0184825 A1 * 7/2015 Chen ....................... F21V 21/08 362/186

OTHER PUBLICATIONS

Alia Akkam, "Lindsey Adelman Finds Paradise." https://www.architecturaldigest.com/story/lindsey-adelman-finds-paradise, Architectural Digest, Mar. 18, 2021.
Lindsey Adelman Studio on Instagram: "Paradise Chandelier in Brushed and Polished Brass, Clear Glass Colorway and Black Lashing," Mar. 18, 2021.

* cited by examiner

*Primary Examiner* — Fatima N Farokhrooz
(74) *Attorney, Agent, or Firm* — Weiss & Arons LLP

(57) ABSTRACT

A light fixture may include a caged frame that includes spokes enclosing a globe. The frame may be configured to enable removal of one or more of the spokes to create clearance for replacement of a broken globe. The frame may include one or more frame bases. Each frame base may include inner and outer supports that retain ends of spokes therebetween when the fixture is assembled. The outer support may be configured to retain some spoke ends in a manner that may require a tool to remove them from the outer support. The inner support may be configured to enable one or more spoke ends to be removed from the inner support without a tool. The frame bases may be loosened to remove one or more removable spokes to create a temporarily larger clearance in the frame for globe replacement.

28 Claims, 14 Drawing Sheets

CAGED GLASS FIXTURE

CROSS-REFERENCE TO RELATED APPLICATION

This is a nonprovisional application of U.S. Provisional Application No. 63/454,824, filed Mar. 27, 2023, which is hereby incorporated by reference herein in its entirety.

BACKGROUND

A light fixture may include a translucent body, such as a glass cover or enclosure, that is susceptible to breakage. For a caged light fixture, it may be complicated to replace a broken translucent body because the caged frame that surrounds the translucent body may limit access. It would therefore be desirable to provide a caged light fixture that includes a frame and a translucent body situated within the frame wherein the fixture is configured to enable a broken translucent body to be replaced if necessary.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
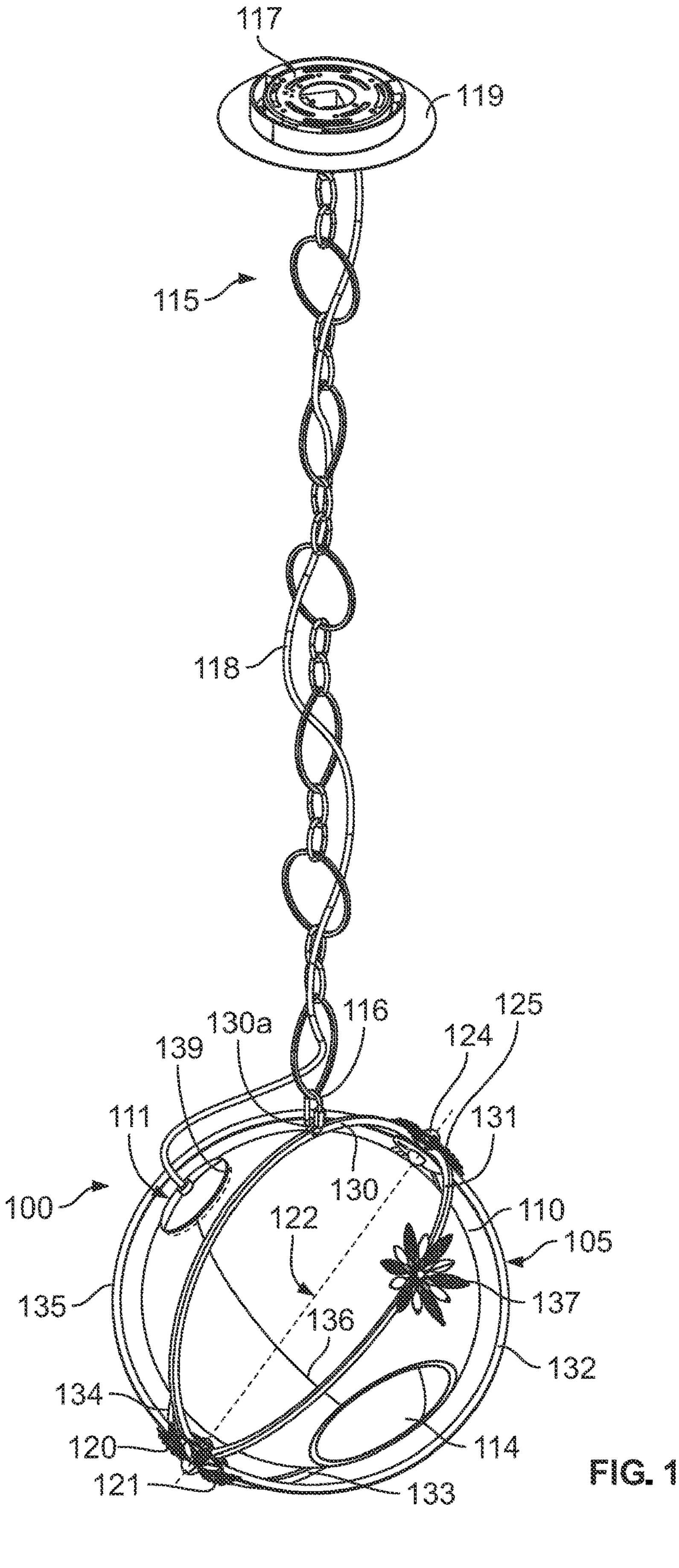
FIG. 1 shows an illustrative fixture in accordance with principles of the invention.

Apparatus and methods for lighting are provided.

The lighting apparatus may include a light fixture. The light fixture may include a translucent body. The translucent body may be configured to receive a lighting module. The fixture may be a hanging fixture that is configured to be suspended from a surface.

The light fixture may include a frame. The frame may surround the translucent body. The frame may have a frame base. The frame base may define a central axis. The frame may include spokes. A spoke may have an end. The frame base may be configured to fix ends of the spokes in a pattern about the central axis. The frame base may include a first support. The first support may be configured to receive a first group of the ends. The frame base may include a second support. The second support may be configured to receive a second group of the ends. The spokes may form a frame. The frame may be fenestrated. The spokes may be configured to enclose the translucent body.

The first support may not be configured to receive an end from the second group of the ends. The second support may not be configured to receive an end from the first group of the ends. The frame base may be configured to release ends from the first group by user manipulation of the frame base without a tool. Absent use of a tool, the frame base may not release ends from the second group.

Displacement of one or more ends of the first group may provide clearance for insertion of a replacement translucent body into the frame. The displacement may provide for removal of at least one of the spokes to provide the clearance for insertion into the frame of the replacement translucent body. The replacement translucent body may be dimensioned to fit through the clearance. The displacement of the ends of the first group may enable removal of the translucent body from the frame.

A second frame base may be configured to fix other ends of the spokes in the pattern about the central axis. The other ends of the spokes may be on the second ends of the spokes opposite the "ends", or first end, of the spokes. The second frame base may include a third support. The third support may be configured to receive a third group of the other ends. The second frame base may include a fourth support. The fourth support may be configured to receive a fourth group of the other ends. The second frame base may be located opposite the first frame base along the central axis. The third support may not be configured to receive an end from the fourth group. The fourth support may not be configured to receive an end from the third group.

The frame base may be configured to release ends from the third group by user manipulation of the frame base without a tool. Absent use of a tool, the frame base may not release ends from the fourth group.

The ends that are received by the second support may be welded to the second support. The other ends that are received by the fourth support may be welded to the fourth support.

The displacement of one or more of the ends of the first group and one or more of the ends from the third group may provide clearance in the frame for insertion of a replacement translucent body into the frame. The first support may be connected to, and spaced apart from, the second support with a spacer. The first and second group ends may be configured to be disposed between the first and second supports. The first group of the ends may be received by the first support, and the second group of the ends may be received by the second support. The second support may define key holes that may be configured to receive the second group of the ends. The first support may include an inner support. The inner support may be positioned inside the frame. The second support may include an outer support. The outer support may be positioned outside the frame.

The spokes may be spaced evenly about the central axis. One or more of the spokes, having an end received by the fourth support, may include an engaging member. The engaging member may be configured to be engaged by a suspension member that is configured to suspend the fixture from a structure.

The frame may be contoured to cradle the translucent body. The translucent body may be configured to be rotated. The rotation may be by hand. The rotation may be relative to the frame. The rotation may be about one or more of three orthogonal axes within the frame. The translucent body may be configured to rest in an orientation in the frame without being fastened to the frame by a fastener.

A light source housing may be configured to be secured to the translucent body at an aperture defined in the translucent body. The light fixture may include a securement ring. The securement ring may be configured to secure the light source housing inside the translucent body. The securement ring may be configured to be removeable such that the light source housing may be removable from the translucent body. The securement ring may be configured such that the light source housing may be insertable into a replacement translucent body. The light source housing may include a light source.

The light source may include an LED light source. The translucent body may define an orifice that is located opposite the aperture. The orifice may be configured to allow light emitted by the light source to propagate.

The translucent body may include a globe. The globe may have any suitable shape. The globe may be rounded. The translucent body may include a diffuser. The translucent body may include translucent material.

The light fixture may include six spokes. The frame may be configured as a cage.

The invention is further illustrated with reference to FIGS. 1-14.

FIG. 1 shows an illustrative apparatus for lighting. The apparatus may include light fixture 100. Light fixture 100 may include a frame 105. Light fixture 100 may include a translucent body, such as a globe 110. Globe 110 may be inside of and surrounded by frame 105. Light source housing 111 that encloses a light source may be disposed within globe 110. Globe 110 may be made, at least in part, from a translucent material, such as translucent glass. Alternatively, globe 110 may be made from plastic or another translucent material.

Light fixture 100 may be configured to be suspended from a structure (not shown). The structure may be an architectural or environmental structure (e.g., a ceiling). Light fixture 100 may include a suspension member 115. When light fixture 100 is mounted to a structure, suspension member 115 may extend vertically from the structure and may define a vertical axis. Suspension member 115 may be a chain that includes one or more links 116. Light fixture 100 may include a mounting bracket 117 that may connect suspension member 115 to the structure from which light fixture 100 may be suspended. Light fixture 100 may include, an electrical wire 118 that connects a light source 113 in light source housing 111 to an electrical connection, such as to a wire in, or extending from, the structure. Light fixture 100 may include a canopy 119 that may cover mounting bracket 117.

Light source housing 111 may be inserted through an aperture 139 into an interior of globe 110. Light source in light source housing 111 may include an LED light source. The light source may be replaceable. An orifice 114 may be located opposite aperture 139 in which light source housing 111 may be inserted. Globe 110 may include a diffuser. Diffusive material may be disposed in, near or at orifice 114. Orifice 114 may be configured to allow light emitted by the light source to propagate out of globe 110.

Frame 105 may include one or more bases. A first frame base 120 on light fixture 100 may define a central axis 122 of light fixture 100. Frame 105 may include a second frame base 124, which may be located opposite first frame base 120. Second frame base 124 may further define central axis 122 such that central axis 122 extends between first frame base 120 and second frame base 124. Second frame base 124 may be identical to first frame base 120. Second frame base 124 may have one or more features of first frame base 120.

Frame 105 may be configured as a cage. Frame 105 may include six spokes 130, 131, 132, 133, 134, 135. Spokes 130-135 may be configured to surround globe 110. Spokes 130-135 may be evenly spaced about central axis 122 and outside of globe 110. The number of spokes included in frame 105 is not limited to six spokes. Frame 105 may include more or fewer than six spokes.

A first end of each of spokes 130-135 may be retained within first frame base 120. A second end of each of spokes 130-135 may be retained within second frame base 124. The first end of one or more of, but not all, spokes 130-135 may be configured to be unremoveable from first and second frame bases 120, 124, after assembly of light fixture 100. Unremovable spokes may be unremovable without user manipulation of frame base 120 with a tool to separate the first end of the one or more unremovable spokes from a frame base.

One or more of, but not all, spokes 130-135 may be removable from light fixture 100 after assembly of light fixture 100 without user manipulation of a tool. In the illustrated arrangement, spokes 130-134 may be unremovable while spoke 135 may be removable without user manipulation of a tool. The one or more removable spokes may be configured to be removable by loosening the first frame base 120 and loosening the second frame base 124.

Spoke 130 or a different non-removable spoke may include an engaging member **130*a* to connect suspension member 115 to frame 105. Where suspension member 115 is a chain, engaging member 130*a* may be a chain hanging point that may include, for example, a metal loop or hook formed on spoke 130 that is configured to engage, for example, with a link 116 on suspension member 115. Engaging member 130*a* may be positioned away from an end of spoke 130 such that frame 105 may be suspended from a structure with central axis 122 at an oblique angle relative to the vertical axis defined by suspension member 115**.

Light fixture 100 may include a fastener (not shown). The fastener may engage globe 110. The fastener may engage frame 105. The fastener may have rigidity sufficient to maintain the orientation of globe 110 in frame 105.

Frame 105 may be contoured to cradle globe 110 without being fastened to frame 105 by a fastener. Globe 110 may rest in frame 105. Globe 110 may rest against one or more spokes 130-135 or frame bases 120, 124, in an orientation. Globe 110 may be configured to be rotated, by a hand of a user, relative to the frame from a first orientation to a second orientation. The rotation may be about one or more of three orthogonal axes within frame 105.

As globe 110 may be resting on frame 105 without a fastener, spacing between adjacent spokes may need to be smaller than a diameter of globe 110 so that globe 110 is retained within frame 105. Therefore, there may not be sufficient clearance between spokes to replace a broken globe without removing one or more spokes from frame 105.

Globe 110 may include a decorative element such as a line 136 or a pattern. One or more ornaments, such as ornament 137 and ornament 138 (FIGS. 3, 4), may be attached to different locations on frame 105. Other ornaments 121, 125 may be attached to first and second frame bases 120 and 124, respectively. One or more of the ornaments 121, 125, 137 may take the shape of a flower or other decorative shape.

Figure 2:
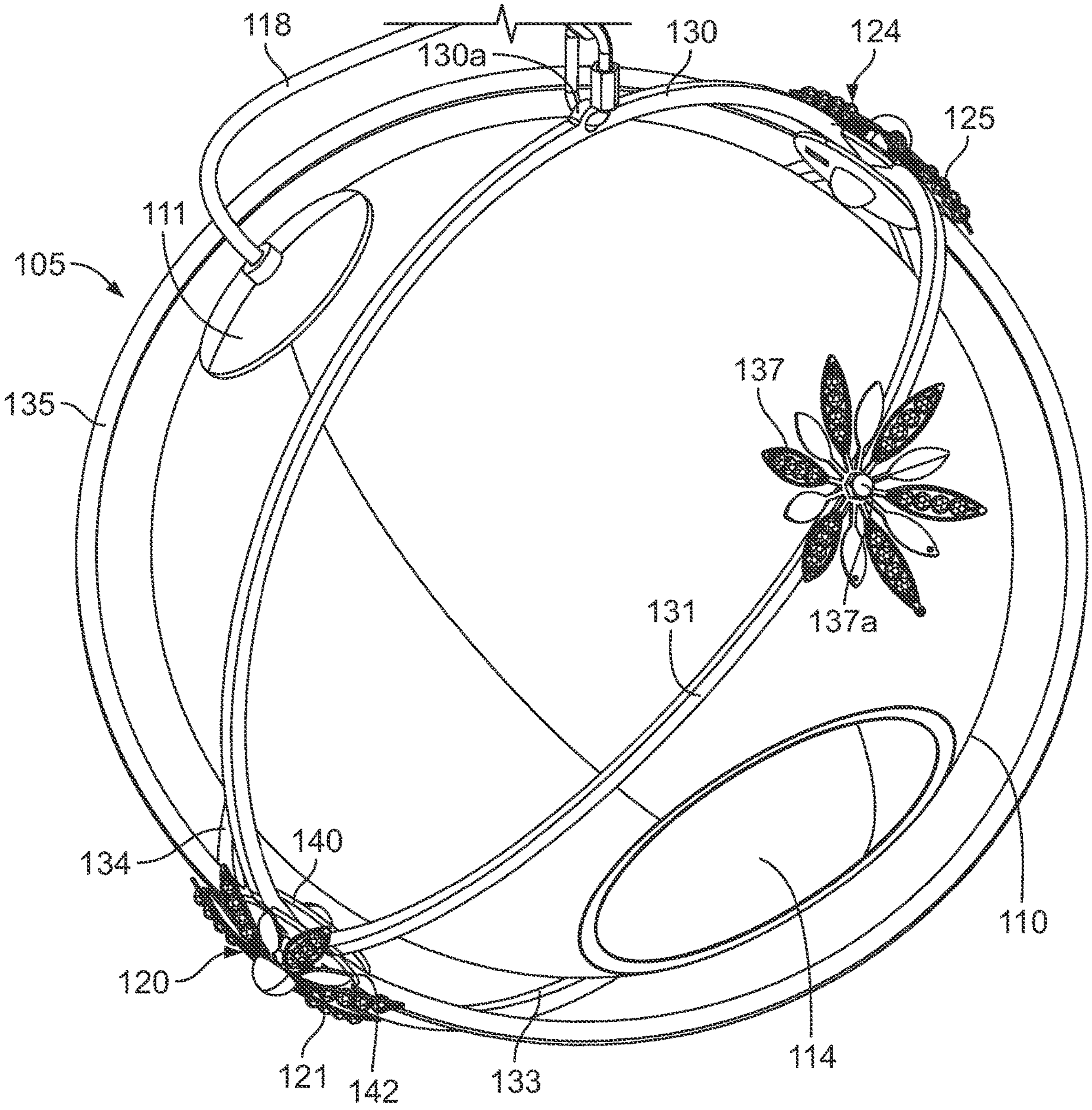
FIG. 2 shows an illustrative close-up view of a part of the subject matter shown in FIG. 1 in accordance with principles of the invention.

FIG. 2 is a close-up view of a part of the subject matter shown in FIG. 1.

Figure 3:
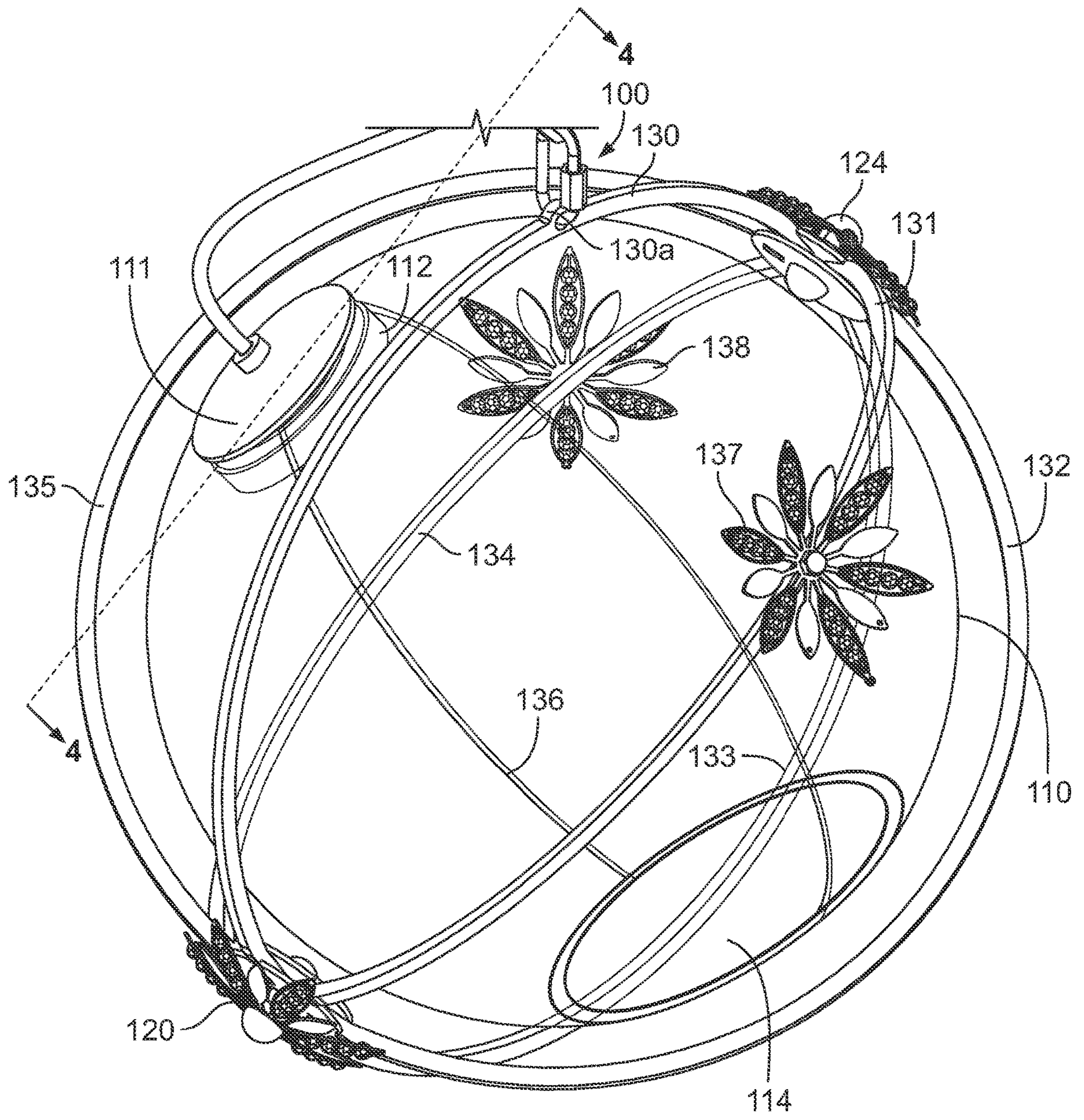
FIG. 3 shows an illustrative view of the subject matter of FIG. 2 with a globe shown as being transparent in accordance with principles of the invention.

FIG. 3 is a view of the subject matter of FIG. 2 with globe 110. A light source securement ring 112 may be visible inside the globe 110.

Figure 4:
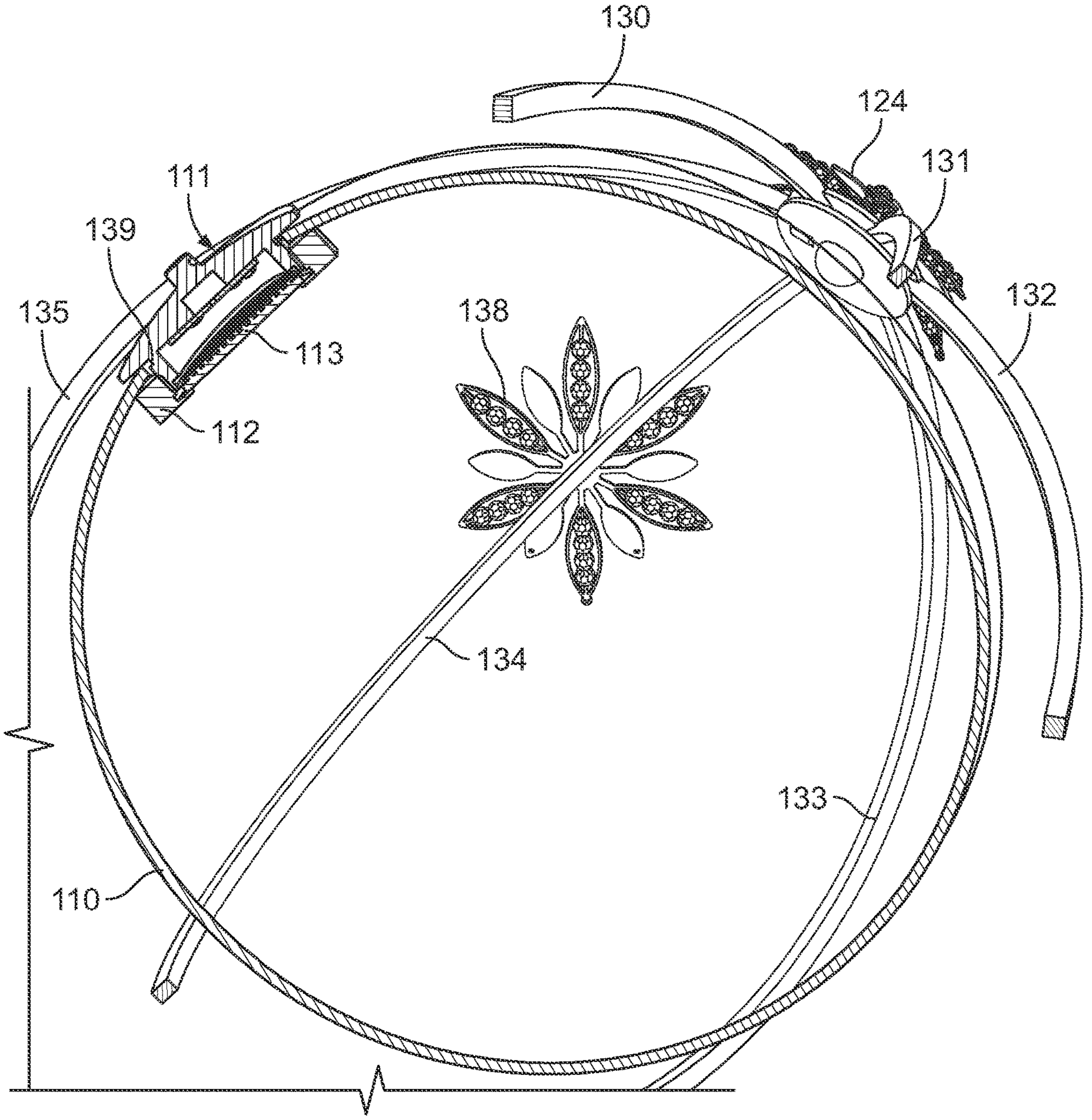
FIG. 4 shows an illustrative partial cross-section showing the light source fastened to the globe in accordance with principles of the invention.

FIG. 4 is a partial cross-sectional view along line 4-4 of FIG. 3. Light source housing 111 may hold a light source 113 within aperture 139 of globe 110. Light source 113 may include an array of LED lights. A light source securement ring 112 may secure light source housing 111 to globe 110. In one arrangement, light source securement ring 112 may be attached to globe 110 below aperture 139 such that light source securement ring 112 may frictionally grip light source 113. In another arrangement, light source housing 111 and light source securement ring 112 may each include threading to screw light source housing 111 into light source securement ring 112.

Figure 5:
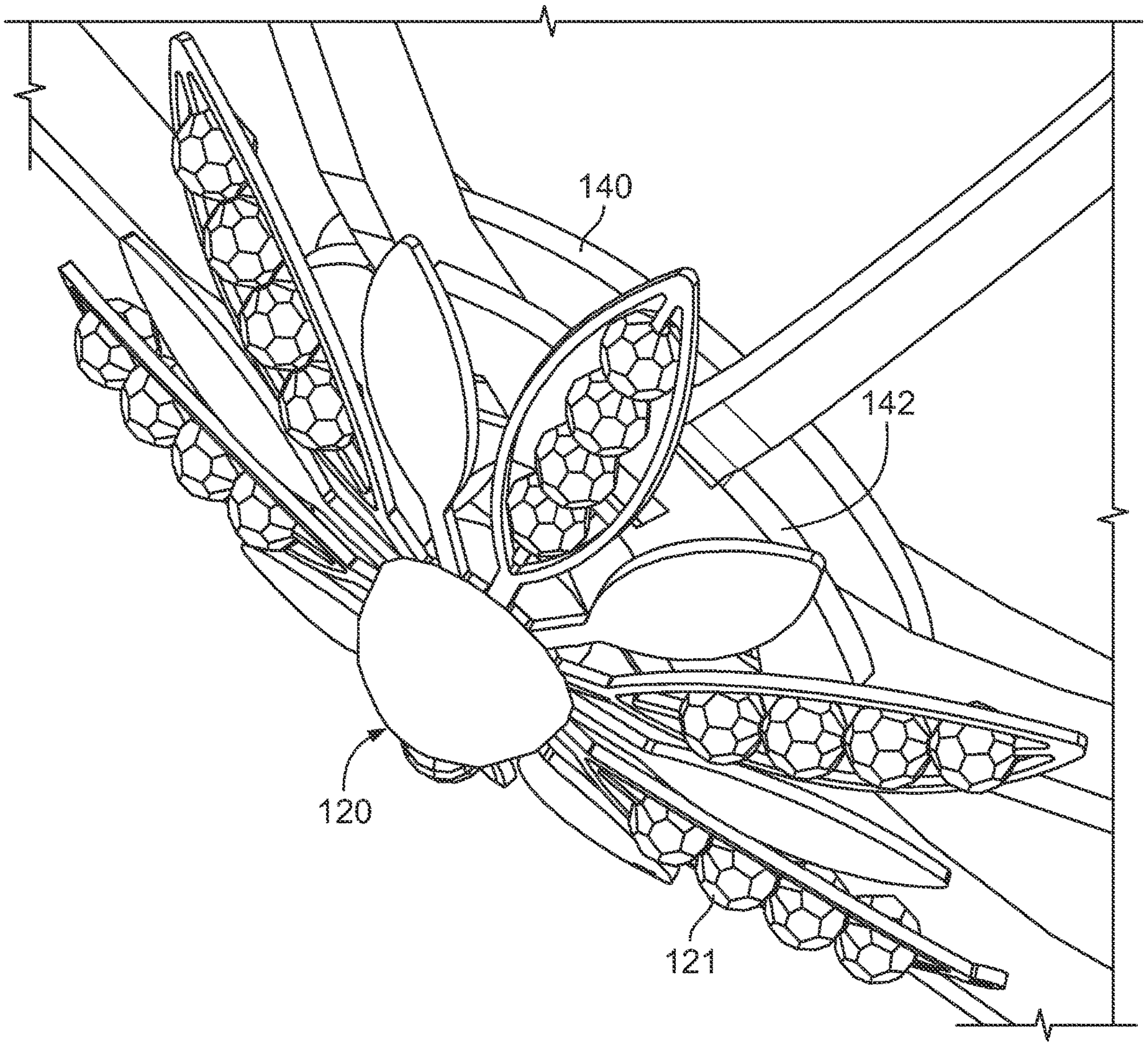
FIG. 5 shows an illustrative base in accordance with principles of the invention.

FIG. 5 shows an illustrative first frame base 120. Base 120 may include a first, inner support 140 that is inside of frame 105. Base 120 may include a second, outer support 142 that is outside of frame 105. Inner and outer supports 140, 142 may be disk-shaped. Inner and outer supports 140, 142 may be assembled together in base 120. Inner and outer supports 140, 142 may be parallel to one another when assembled. An end of each of spokes 130-135 may be positioned between inner support 140 and outer support 142. Base 120 may also include one or more ornaments, such as ornament 121, that may cover base 120.

Second frame base 124, which may be positioned opposite first frame base 120, may be identical to base 120. Second frame base 124 may have one or more features in common with first frame base 120. Base 124 is described further below.

Figure 6:
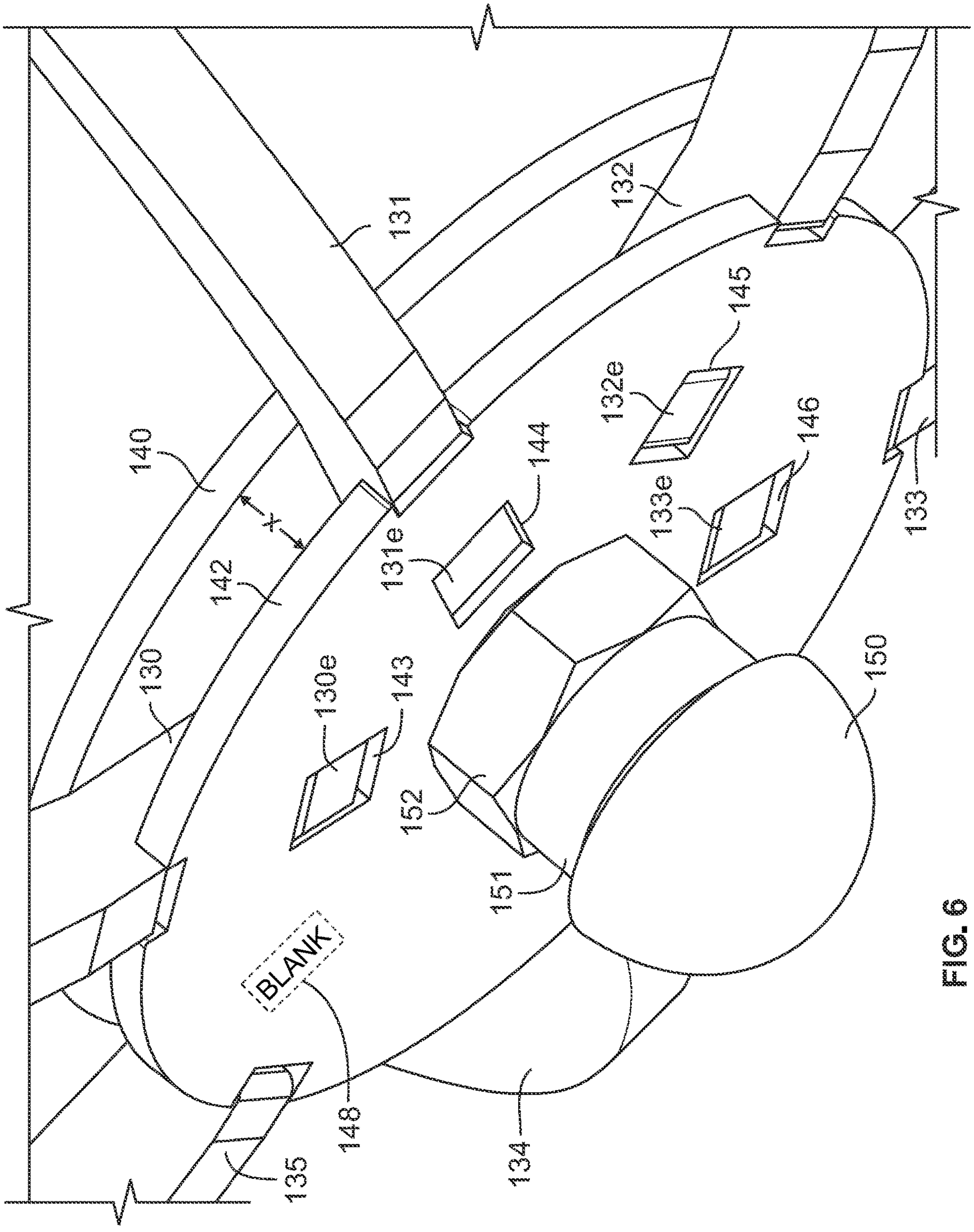
FIG. 6 shows an illustrative base without the ornaments in accordance with principles of the invention.

FIG. 6 shows illustrative frame base 120 where inner and outer supports 140, 142 are assembled and sandwich spokes 130-135. Base 120 is shown in this figure as unadorned with ornaments. Inner and outer supports 140, 142 may be spaced apart by a distance "x."

One group of spokes that includes fewer than all of spokes 130-135 may include keys that fit into corresponding key holes in outer support 142. Keys may take one of different forms. For example, each key for this group of spokes may include an outward-facing projection at one end of spokes. Key holes may be openings in outer support 142 into which the keys fit. Keys may be inserted into key holes in outer support 142 to be retained therein. Key holes may be sized and shaped to retain the respective keys.

Figure 7:
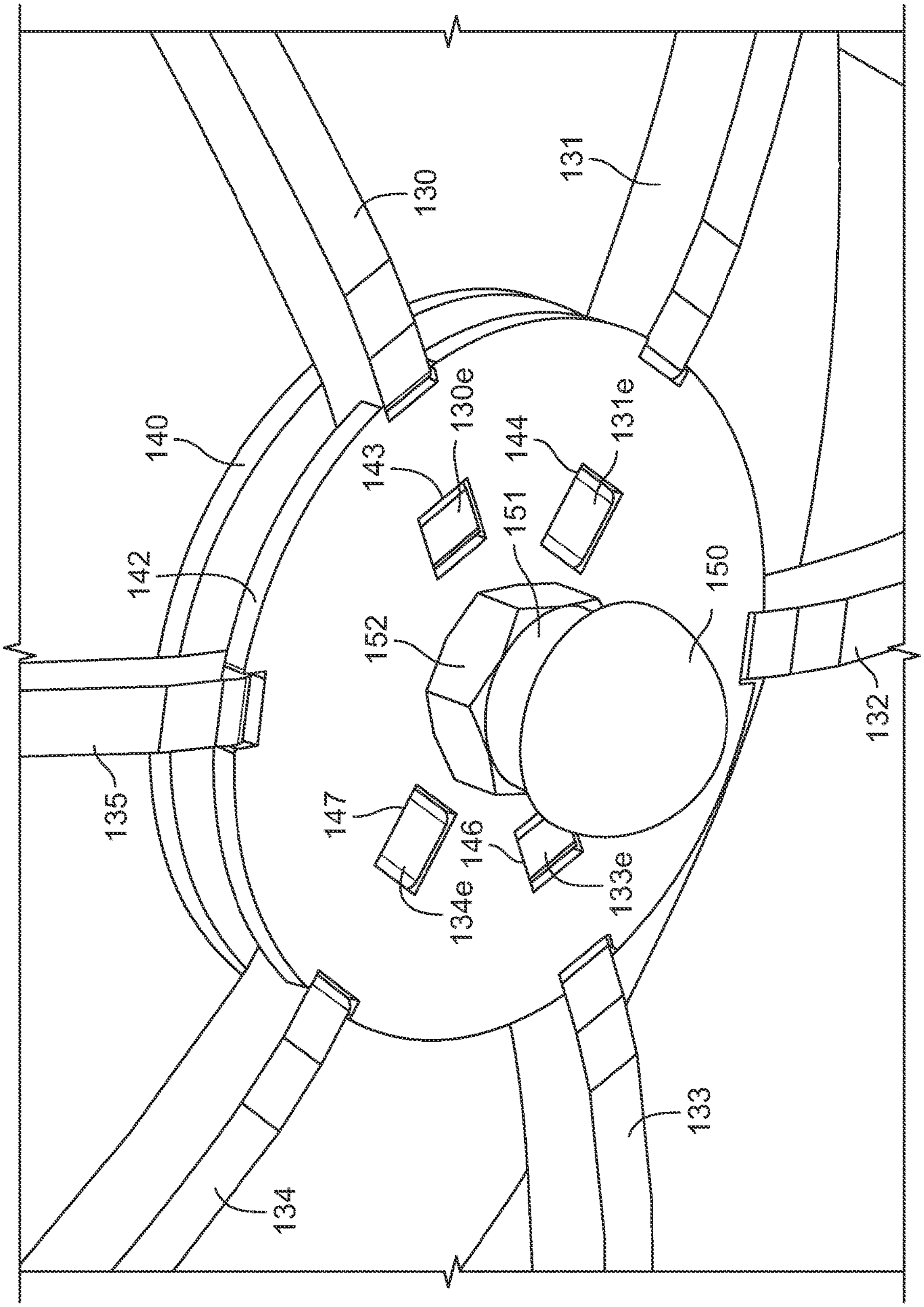
FIG. 7 shows an illustrative blank region in the outer support in accordance with principles of the invention.

The group of spokes that have outward-facing keys may include, for example, spokes 130, 131, 132, 133, 134. Each of these spokes may include a respective key **130*e*, 131*e*, 132*e*, 133*e*, 134*e*. The keys may be provided at a respective end of each of spokes 130-134. FIG. 7 shows key 134*e* on spoke 134 inserted into a key hole 147 on outer support 142. An outward-facing key may not be provided on spoke 135**.

Key holes may be provided in outer support 142, for example, for only those spokes in this group of spokes. Key holes into which the outward-facing keys may be inserted may include key holes 143, 144, 145 and 146, respectively.

One or more of the keys in this group of spokes may be inserted into their respective key holes. These keys may be fixed (locked) into place in their respective key holes in a more permanent manner, such as by, for example, spot welding or attaching with adhesive the keys into their respective key holes, in outer support 142. This may prevent removal of the keys from key holes without user manipulation of a tool.

Figure 8:
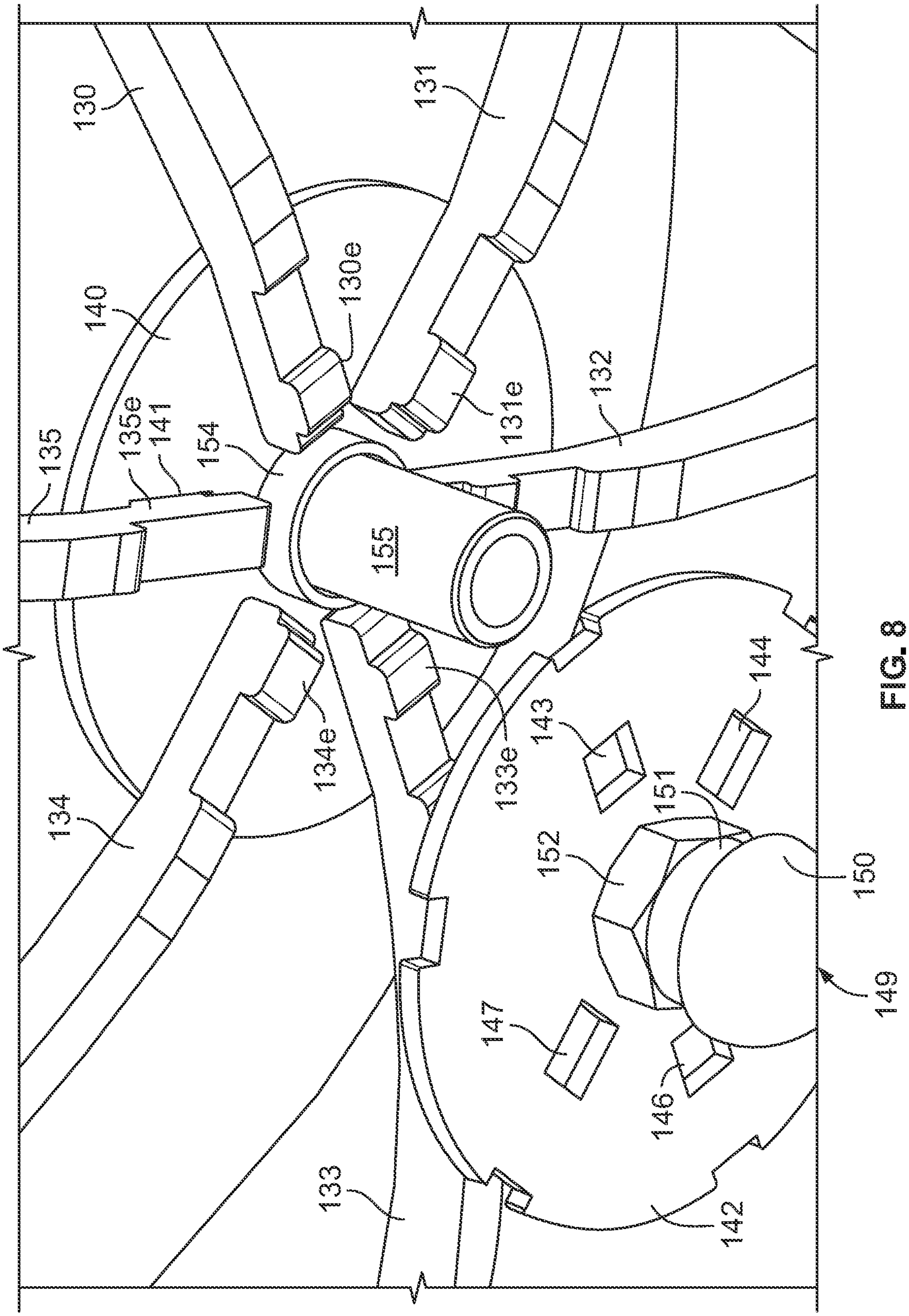
FIG. 8 shows an illustrative base column disassembled in accordance with principles of the invention.

Another group of fewer than all of spokes 130-135 may include one or more respective keys that are configured differently from keys **130*e*, 131*e*, 132*e*, 133*e*, 134*e*. In this other group of spokes, each key may include, for example, an inward-facing projection at the ends of the spokes. As shown in FIG. 8, for example, spoke 135 may have a key 135*e* that may be inward-facing. Key 135*e* on spoke 135 may be inserted within a key hole 141 in inner support 140**.

For one or more spokes of frame 105, no key hole may be provided in outer support 142. The absence of a key hole where an outward-projecting key, if present, may have been inserted in outer support 142 is denoted in FIG. 6 as "blank" 148. Blank 148 may correspond, for example, to a location adjacent spoke 135.

Key **135*e* on spoke 135 may be removable retained, but not fixed into key hole 141 in a permanent manner, by compressing spoke 135 between assembled supports 140, 142. Thus, key 135*e* may not be locked in key hole 141 by, for example, welding or a use of adhesives, that may require a tool to remove key 135*e* from key hole 141. This allows spoke 135 to be removed, if necessary, from frame 105** without user manipulation of a tool.

Base 120 may include a base column 149 that passes through inner and outer supports 140, 142. Supports 140, 142 may be secured relative to one another along base column 149. Supports 140, 142 may hold spokes 130-135 between inner and outer supports 140, 142.

Base column 149 may include an elongated member 155 that may extend through inner and outer supports 140, 142. Base column 149 may include a cap nut 150, one or more bushing 151, nuts 152, spacers, fasteners, threaded rods and the like that may be used to secure inner and outer supports 140, 142 with elongated member 155 extending through supports 140, 142. Elongated member 155 may traverse inner and outer supports 140, 142. Cap nut 150, bushing 151, and nut 152 may be may be tightened to secure elongated member 155 against an outward facing surface of outer support 142. Another cap nut 156 may be tightened to secure elongated member 155 against an inward-facing surface of inner support 140. A spacer 154 may be disposed between inner and outer supports 140, 142, outside of elongated member 155, to maintain a distance between inner and outer supports 140, 142 that is sufficient to provide clearance for a thickness of spoke ends. Spacer 154 and bushing 151 may be formed of the same or different materials. Spokes 130-135 may be compressed between inner and outer supports 140, 142. The non-welded key or keys, which may be fewer than all of the keys, may be secured in a corresponding key hole on inner support 140. For example, key **135*e* on spoke 135 may be secured into key hole 141 on inner support 140**.

Figure 9:
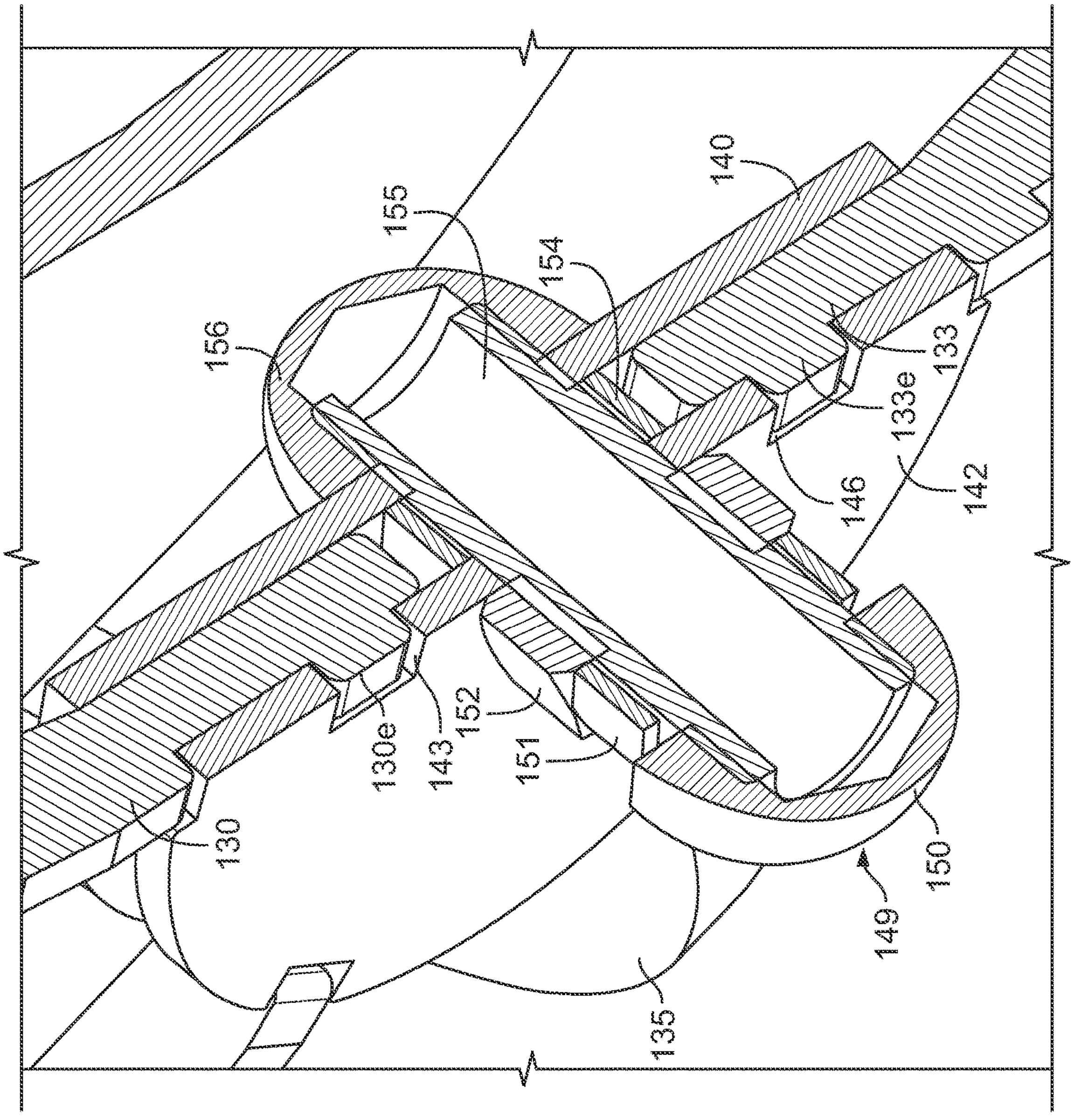
FIG. 9 shows an illustrative cross-section through the base in accordance with principles of the invention.

FIG. 9 shows a cross-section through base 120. The cross-section lies in the plane of two spokes 130, 133 that may be keyed to outer support 142.

Figure 10:
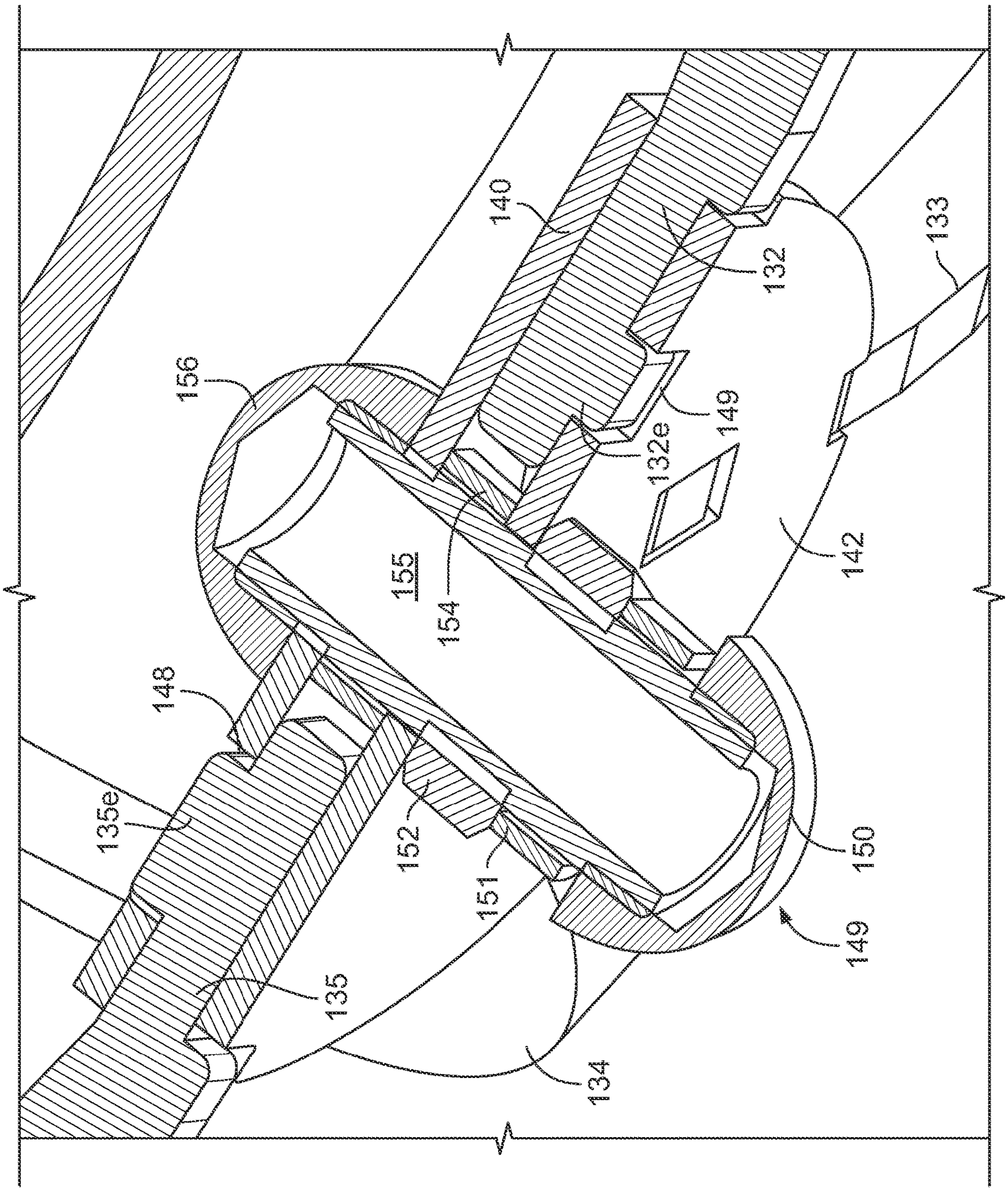
FIG. 10 shows another illustrative cross-section through the base in accordance with principles of the invention.

FIG. 10 shows a different cross-section through base 120. The cross-section lies in the plane of two spokes 132 and 135. The cross-section lies in the plane of one spoke 132 that is keyed to outer support 142 and one spoke 135 that is keyed to inner support 140.

Figure 11:
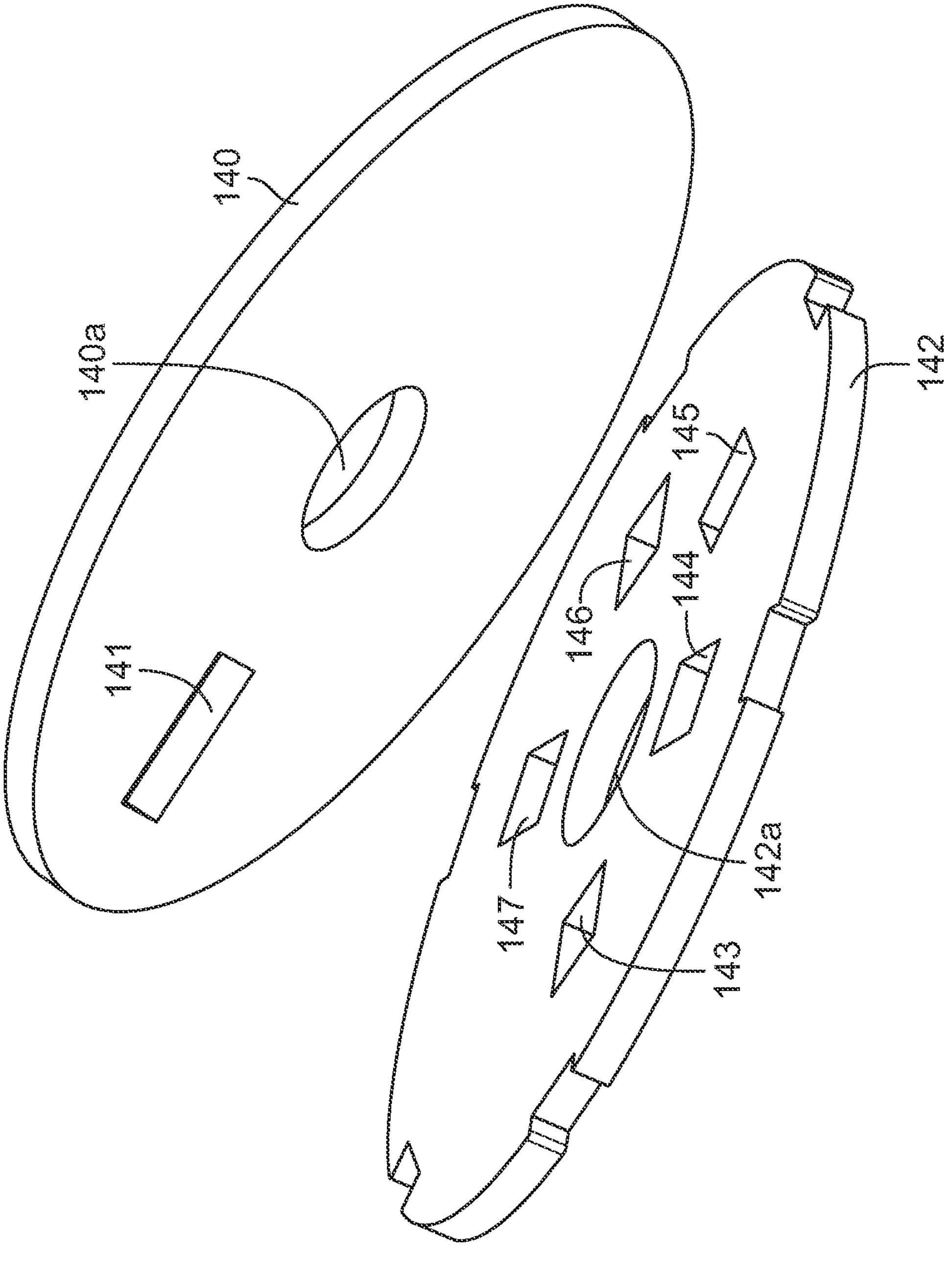
FIG. 11 shows an illustrative top view of the outer support and a bottom view of the inner support in accordance with principles of the invention.

FIG. 11 shows a top view of outer support 142 and a bottom view of inner support 140. Inner and outer supports 140, 142 may include center holes 140*a*, 142*a*, respectively, through which elongated member 155 may pass.

FIGS. 12A, 12B, 12C, and 12D show an illustrative embodiment of frame 105. (Drawings not necessarily to scale.)

Figures 12A, 12B, 12C, 12D:
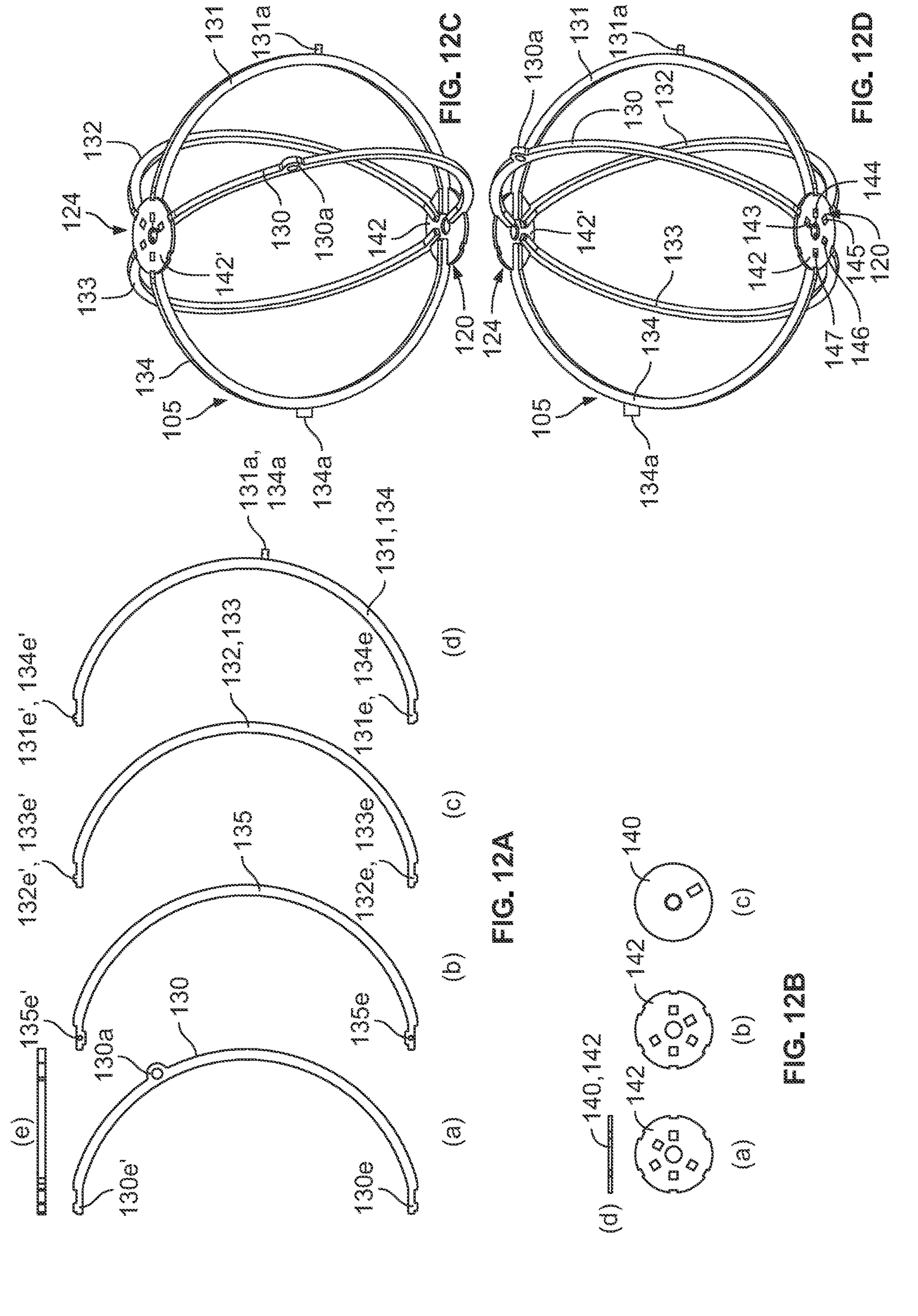
FIGS. 12A, 12B, 12C and 12D show illustrative portions of a frame in accordance with principles of the invention.

Illustrative spokes 130-135 are shown as disassembled in FIG. 12A. As illustrated in (a), spoke 130 may include engaging member 130*a* to engage with a link 116 on suspension member 115. Spoke 130 may include first and second ("other") ends that are configured with outward-facing keys 130*e*, 130*e*' to engage key holes on outer supports 142, 142'. As illustrated in (b), spoke 135 may include first and second ends, each of which has a respective inward-facing key 135*e*, 135*e*'. As illustrated in (c), spokes 131, 134 may be similarly configured. Spokes 131, 134 may include a respective connector 131*a*, 134*a* that may be used to attach ornaments 137, 138 to frame 105. Spoke 131 may include outward-facing keys 131*e*, 131*e*'. Spoke 134 may include outward-facing keys 134*e*, 134*e*'. As illustrated in (d), spokes 132, 133, illustrated in (d), may be similarly configured. Spoke 132 may include outward-facing keys 132*e*, 132*e*', Spoke 134 may include outward-facing keys 134*e*, 134*e*'. A common side view of spokes 130-135 is shown in (e).

Illustrative inner and outer supports 140, 142 are shown in FIG. 12B. Top and bottom views of outer support 140 are shown as (a) and (b). A top view of inner support 140 is shown as (c). A common side view of inner and outer supports 140, 142 is shown as (d).

FIG. 12C shows an illustrative frame 105 that includes spokes 130-134 fixed to outer supports 142, 142' of bases 120, 124. Inner supports 140, 140' are not shown and spoke 135 is shown as not present in frame 105. FIG. 12D shows another perspective of frame 105 shown in FIG. 12C.

Figure 13:
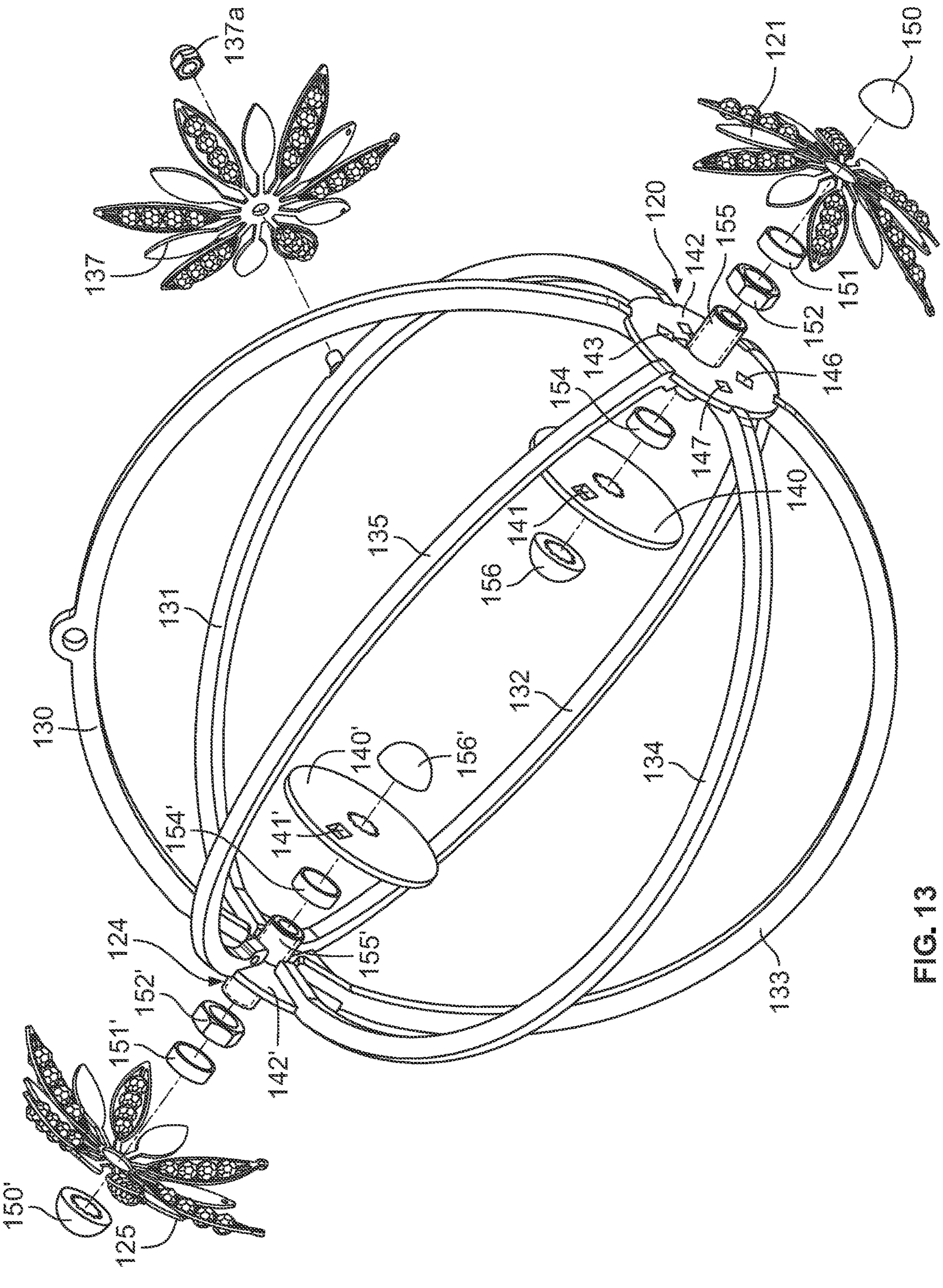
FIG. 13 shows an illustrative exploded view of a frame in accordance with principles of the invention.

FIG. 13 shows an illustrative exploded view of frame 105 with two frame bases 120, 124, without globe 110. As shown, frame base 124 may include a third, inner support 140' and a fourth, outer support 142' that may be assembled together similar to the assembly of inner and outer supports 140, 142 with a second end of each of spokes 130-135 sandwiched between inner and outer supports 140', 142'. Each of the second ends of spokes 130-135 may have respective keys similar to keys 130*e*, 131*e*, 132*e*, 133*e*, 134*e*, 135*e*. These keys on the second ends of the spokes may likewise fit in respective key holes on inner support 140' and outer support 142'. Outward-facing keys on the second ends of spokes 130-134 may be fixed to key holes on outer support 142' and an inward-facing key on spoke 135 may be removably inserted into a key hole on inner support 140'. Although shown as identical, keys and key holes for base 124 may differ in form, shape and size from keys and key holes used for the frame base 120.

Table I lists illustrative parts that may be associated with the frame 105 and components shown in FIG. 13.

TABLE I

Illustrative parts, FIG. 13.

| Item | Description | Examples of Parts in FIG. |
|---|---|---|
| 1 | HEX NUT, 1/8IP 1/2" HEAVY STL ZINC PLATED | 152, 152' |
| 2 | RUNNING THREAD, 1/8-27 IP X 1" | 155, 155' |
| 3 | HEX CAP NUT 8-32 SILVER | 137a |
| 4 | BALL BRASS 1/8-27 | 150, 150', 156, 156' |
| 5 | TUBING, 1/2" OD X .035", 5/32" LONG | 151, 151', 154, 154' |
| 6 | FLOWER 11/64 CH | 137 |
| 7 | FLOWER 13/32 CH | 121, 125 |
| 8 | 7" WELDED SECTOR | 130 |
| 9 | CLAMP WASHER 87/736 SECTORS | 140, 140' |
| 10 | SPOKE 2 7" BALL SECTOR | 135 |

There may not be sufficient clearance between adjacent spokes to replace globe 110 while frame 105 is fully assembled. The clearance that may be needed may include a space that accommodates a diameter of broken globe 110 to be removed out of frame 105 and a diameter of a replacement globe to be inserted into frame 105.

Light fixture 100 may therefore be configured to temporarily create a larger clearance within frame 105 to enable globe 110 to be replaced. Replacement of globe 110 may be achieved with or without removing light fixture 100 from a structure from which it may be suspended.

Figure 14:
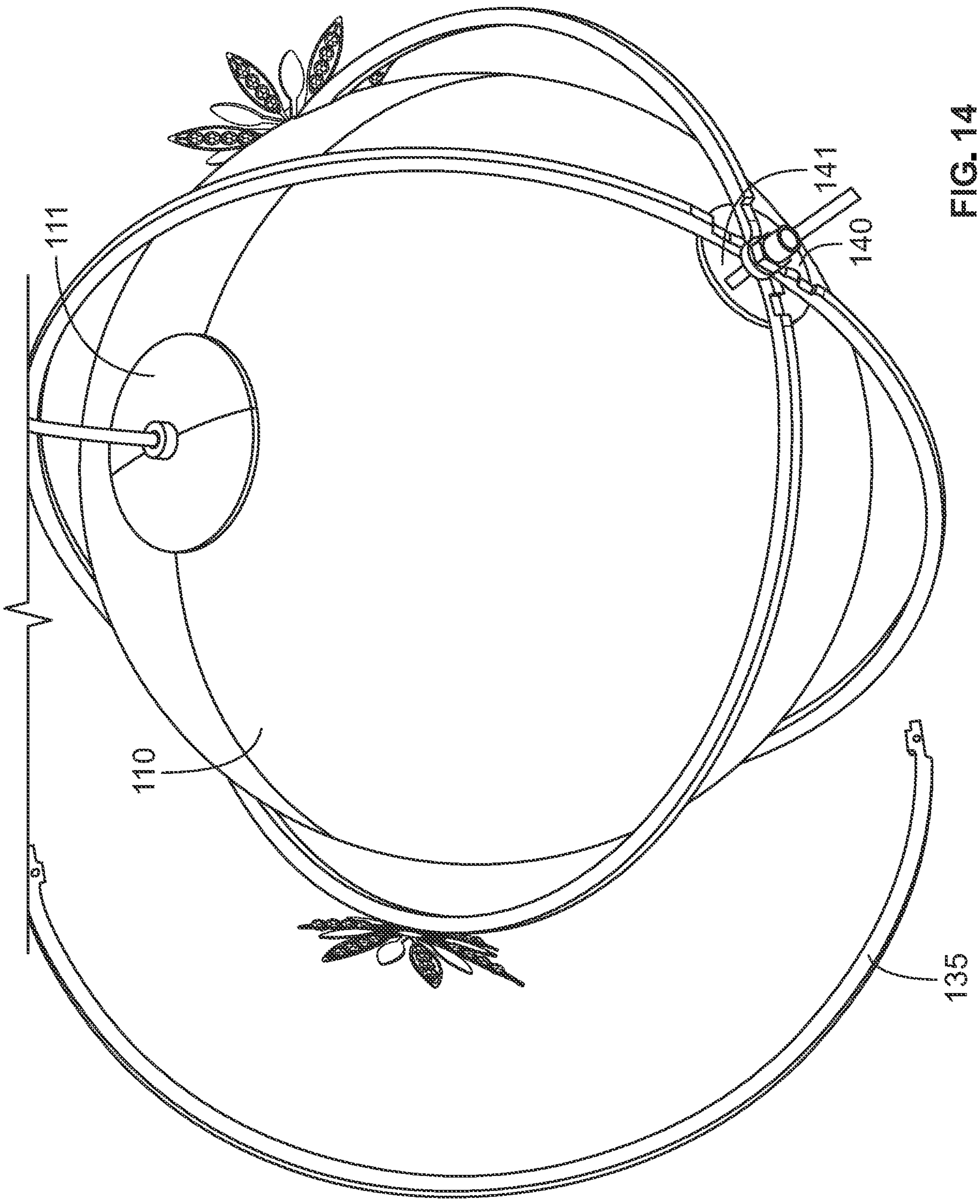
FIG. 14 shows the illustrative fixture of FIG. 1 with a spoke removed in accordance with principles of the invention.

An illustrative method of replacing globe 110 may be performed as follows:

a. First frame base 120 may be loosened, such as by loosening or removing cap nut 150 from base column 149. Inner and outer supports 140, 142 may then be separated from one another with sufficient clearance for a spoke to be removed. For example, if cap nut 150 is screwed onto elongated member 155 or to another component, cap nut 150 may be unscrewed partially or completely.

b. A first end of one or more spokes that are not permanently connected to outer support 142 may be removed from a corresponding hole/key hole in which it was retained when inner and outer supports 140, 142 are assembled. The one or more spokes that are permanently connected to outer support 142 may maintain a portion of the structure of frame 105 intact while globe 110 is being replaced.

c. Cap nut 150' on second frame base 124 may also be loosened or removed to separate inner and outer supports 140', 142' on second frame base 124 so that a second end of one or more spokes may be removed from inner support 140' on second frame base 124.

d. The one or more removable spokes may then be temporarily removed from both bases 120, 124, thereby creating a larger clearance to remove a broken globe from frame 105 and to insert a replacement into frame 105.

e. In the arrangement illustrated above, spoke 135 may be the spoke that is removed to create a sufficiently large clearance for globe 110 to be replaced. FIG. 14 shows the illustrative light fixture 100 of FIG. 1 with spoke 135 removed.

f. Light source housing 111 may be removed from globe 110 before or after globe 110 is removed from frame 105. This may require a removal of securement ring 112. Light source 113 may be installed in the replacement globe.

g. After insertion of a replacement globe into frame 105, spoke 135 may be inserted into a corresponding key hole in inner supports 140 and 140', and first and second frame bases 120, 124 may be reassembled to fix spoke 135 back into place in frame 105.

Apparatus and methods may involve the use of any suitable combination of elements, components, or method steps disclosed herein. Embodiments may include features that are neither shown nor described in connection with the illustrative apparatus. Features of illustrative apparatus may be combined. For example, an illustrative embodiment may include features shown in connection with another illustrative embodiment. It is to be understood that structural, functional and procedural modifications or omissions may be made without departing from the scope and spirit of the present invention.

Thus, apparatus and methods for providing a light fixture have been provided. Persons skilled in the art will appreciate that the present invention may be practiced by other than the described embodiments, which are presented for purposes of illustration rather than of limitation.

What is claimed is:

1. A light fixture comprising: a translucent body configured to receive a lighting module; a frame base that: defines a central axis; and is configured to fix ends of spokes in a pattern about the central axis; and includes: a first support that is configured to receive a first group of the ends; and a second support that is configured to receive a second group of the ends; wherein: the spokes form a frame that is fenestrated and is configured to enclose the translucent body; the first support is not configured to receive an end from the second group; the second support is not configured to receive an end from the first group; the first support includes an inner support that is positioned inside the frame; and the second support includes an outer support that is positioned outside the frame.

2. The light fixture of claim 1 wherein the frame base is configured to:

release ends from the first group by user manipulation of the frame base without a tool; and absent use of a tool, not release ends from the second group.

3. The light fixture of claim 1 wherein displacement of an end of the first group provides clearance for insertion into the frame of a replacement translucent body.

4. The light fixture of claim 3 wherein the displacement provides for removal of at least one of the spokes to provide the clearance for insertion into the frame of the replacement translucent body.

5. The light fixture of claim 4 wherein the replacement translucent body is dimensioned to fit through the clearance.

6. The light fixture of claim 3 wherein the displacement of the ends of the first group enables removal of the translucent body from the frame.

7. The light fixture of claim 1 further comprising:

a second frame base that:

is configured to further fix other ends of the spokes in the pattern about the central axis; and includes:

a third support that is configured to receive a third group of the other ends; and a fourth support that is configured to receive a fourth group of the other ends.

8. The light fixture of claim 7 wherein the second frame base is located opposite the first frame base along the central axis.

9. The light fixture of claim 7 wherein:

the third support is not configured to receive an end from the fourth group; and the fourth support is not configured to receive an end from the third group.

10. The light fixture of claim 7 wherein the frame base is configured to:

release ends from the third group by user manipulation of the frame base without a tool; and, absent use of a tool, not release ends from the fourth group.

11. The light fixture of claim 7 wherein the ends that are received by the second support are welded to the second support and wherein the other ends that are received by the fourth support are welded to the fourth support.

12. The light fixture of claim 1 wherein displacement of one or more of the ends of the first group and one or more of the ends from the third group provides clearance in the frame for insertion into the frame of a replacement translucent body.

13. The light fixture of claim 1 wherein:

the first support is connected to, and spaced apart from, the second support with a spacer; and the first and second group ends are configured to be disposed between the first and second supports such that:

the first group ends are received by the first support; and the second group ends are received by the second support.

14. The light fixture of claim 1 wherein the second support defines holes that are configured to receive the second group of the ends.

15. The light fixture of claim 1 wherein the spokes are spaced evenly about the central axis.

16. The light fixture of claim 1 wherein:

one or more of the spokes, having an end received by the fourth support, includes an engaging member that is configured to be engaged by a suspension member that is configured to suspend the fixture from a structure.

17. The light fixture of claim 1 wherein the frame is contoured to cradle the translucent body.

18. The light fixture of claim 1 wherein the translucent body is configured to be rotated, by hand, relative to the frame, about three orthogonal axes within the frame.

19. The light fixture of claim 1 wherein the translucent body is configured to rest, in the frame, in an orientation, without being fastened to the frame by a fastener.

20. The light fixture of claim 1 further comprising a light source housing that is configured to be secured to the translucent body at an aperture defined in the translucent body.

21. The light fixture of claim 20 further comprising a securement ring that is configured to secure the light source housing inside the translucent body.

22. The light fixture of claim 21 wherein the securement ring is configured to be removeable from the light source housing such that the light source housing is:

removable from the translucent body; and insertable into a replacement translucent body.

23. The light fixture of claim 20 wherein the light source housing includes a light source.

24. The light fixture of claim 23 wherein the light source includes an LED light source.

25. The light fixture of claim 20 wherein the translucent body defines an orifice that is located opposite the aperture.

26. The light fixture of claim 1 wherein the translucent body includes a globe.

27. The light fixture of claim 1 wherein the light fixture has six spokes.

28. The light fixture of claim 1 wherein the frame is configured as a cage.

* * * * *